(12) United States Patent
Yang et al.

(10) Patent No.: US 12,498,795 B2
(45) Date of Patent: Dec. 16, 2025

(54) INPUT DEVICE AND SOFTWARE RUNNING STATUS INDICATION SYSTEM

(71) Applicant: Primax Electronics Ltd., Taipei (TW)

(72) Inventors: Yu-Zeng Yang, Taipei (TW); Hui-Ling Lin, Taipei (TW); Shi-Jie Zhang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/791,295

(22) Filed: Jul. 31, 2024

(65) Prior Publication Data

US 2025/0362759 A1    Nov. 27, 2025

Related U.S. Application Data

(60) Provisional application No. 63/650,224, filed on May 21, 2024.

(51) Int. Cl.
  *G06F 3/02* (2006.01)
  *F21V 8/00* (2006.01)
  *G06F 11/34* (2006.01)
  *G08B 5/36* (2006.01)

(52) U.S. Cl.
  CPC ........... *G06F 3/0227* (2013.01); *G02B 6/006* (2013.01); *G02B 6/0083* (2013.01); *G06F 3/0202* (2013.01); *G06F 11/3495* (2013.01); *G08B 5/36* (2013.01)

(58) Field of Classification Search
  CPC .. G06F 3/0227; G06F 3/0202; G06F 11/3495; G02B 6/006; G02B 6/0083; G08B 5/36
  See application file for complete search history.

(56) References Cited

U.S. PATENT DOCUMENTS

2006/0008123 A1* 1/2006 Sweeney ................ G09B 17/00
  382/114
2010/0265183 A1* 10/2010 Mail .................... G06F 3/04895
  345/173
2024/0038459 A1* 2/2024 Chen ...................... G06F 1/1662

\* cited by examiner

*Primary Examiner* — Amit Chatly
(74) *Attorney, Agent, or Firm* — KIRTON McCONKIE; Evan R. Witt

(57) ABSTRACT

A software running status indication system includes a computing device and an input device. When a program is executed in the computing device, the program acquires a running status of a software. The input device is connected with the computing device. The input device includes a luminous display area. The running status of the software is displayed through the luminous display area.

23 Claims, 9 Drawing Sheets

INPUT DEVICE AND SOFTWARE RUNNING STATUS INDICATION SYSTEM

CROSS-REFERENCE TO RELATED APPLICATION

This application claims priority to U.S. Provisional Patent Application No. 63/650,224 filed May 21, 2024, the contents of which are incorporated herein by reference.

FIELD OF THE INVENTION

The present invention relates to an input device and a software running status indication system, and more particularly to an input device capable of indicating the running status of a software executed by a computing device.

BACKGROUND OF THE INVENTION

Generally, the indicator light of a conventional input device (e.g., a keyboard, a mouse device, or the like) can be used to display the status of the input device itself. For example, the status of the input device includes the residual power of the input device, the connection status of the input device, or the like. In addition, the indicator light of the existing input device can also be used to display the operating modes of other devices connected to the host of a computing device (e.g., a microphone, a speaker, or the like). For example, the indicator light can display the on/off statuses of a microphone switch or the on/off statuses of a speaker switch.

However, as all walks of life around the world are developed more and more rapidly, the workload that all walks of life need to handle has become larger and the work content has become more diversified. The use of artificial intelligence is helpful for all walks of life to handle the increasingly complex work projects more efficiently. Artificial intelligence can use machine learning and deep learning networks to imitate human intelligence to solve complex problems. Artificial intelligence can also process information on a large scale, including digesting patterns and identifying information, and further provide answers. Professionals in various fields can use artificial intelligence to efficiently solve problems in various fields, such as business analysis, or medical diagnosis, . . . , and so on.

In view of the above situation, software engineers have developed many generative artificial intelligence software. Although the generative artificial intelligence software provides more diverse and complex functions, the input devices can only display the statuses of the input device itself and the statuses of other devices. That is, the conventional input devices cannot further support the function of displaying the running status of the software. Therefore, there is a need of providing an improved input device to allow users to clearly know the status of the computing device executing the software.

SUMMARY OF THE INVENTION

An object of the present invention provides an improved input device and a software running status indication system with the input device.

The other objects and advantages of the present invention will be understood from the disclosed technical features.

In accordance with an aspect of the present invention, a software running status indication system is provided. The software running status indication system includes a computing device and an input device. When a program is executed in the computing device, the program acquires a running status of a software. The input device is connected with the computing device. The input device includes a luminous display area. The running status of the software is displayed through the luminous display area.

In an embodiment, the running status of the software includes at least one of a sleep stage, an instruction waiting stage, an instruction receiving stage, an instruction computing stage and a result generating stage.

In an embodiment, the running stage of the software includes at least one of a sleep stage, an instruction waiting stage, an instruction receiving stage, an instruction computing stage and a result generating stage.

In an embodiment, the luminous display area is in a basic luminous mode when the software is in the sleep stage, the luminous display area is in a first luminous mode when the software is in the instruction waiting stage, the luminous display area is in a second luminous mode when the software is in the instruction receiving stage, the luminous display area is in a third luminous mode when the software is in the instruction computing stage, and the luminous display area is in a fourth luminous mode when the software is in the result generating stage. The basic luminous mode, the first luminous mode, the second luminous mode, the third luminous mode and the fourth luminous mode are different luminous modes.

In an embodiment, when the software is in the instruction waiting stage, the program judges whether an instruction has been inputted. If the program judges that any instruction has been inputted, the software enters the instruction receiving stage.

In an embodiment, if the program judges that no instruction has been inputted, the software is maintained in the instruction waiting stage, and then the program judges whether the software has been idle for more than a first predetermined time. If the software has been idle for more than the first predetermined time, the program allows the software to be restored to the sleep stage.

In an embodiment, the first predetermined time is 3 seconds.

In an embodiment, when the software is in the instruction receiving stage, the program further judges whether the instruction receiving stage has been idle for more than a second predetermined time. If the instruction receiving stage has been idle for more than the second predetermined time, a brightness of the luminous display area is gradually decreased.

In an embodiment, if the program judges that the instruction receiving stage has been idle for more than a third predetermined time, the program allows the software to enter the instruction computing stage.

In an embodiment, the second predetermined time is 0.2 second, and the third predetermined time is 2 seconds.

In an embodiment, the input device further includes a control module and an instruction trigger area, and the computing device further includes an embedded controller.

In an embodiment, when the control module detects that the instruction trigger area is activated or triggered, the control module controls the computing device to execute the program through the embedded controller, and the program further opens the software.

In an embodiment, when the control module detects that the instruction trigger area is activated or triggered again, the control module controls the computing device through the embedded controller, so that the program closes the software.

In accordance with another aspect of the present invention, an input device is provided. The input device is connected with a computing device. When a program is executed in the computing device, the program acquires a running status of a software. The input device includes a luminous display area. The running status of the software is displayed through the luminous display area.

In an embodiment, the running status of the software includes at least one of a sleep stage, an instruction waiting stage, an instruction receiving stage, an instruction computing stage and a result generating stage.

In an embodiment, the input device further includes a key module, and the key module include at least one key structure, wherein one of the at least one key structure includes a keycap, and the luminous display area is formed on the keycap.

In an embodiment, the key module includes a switch unit, the switch unit includes an instruction trigger area, and the instruction trigger area is located under the at least one key structure. When the instruction trigger area is activated or triggered, the computing device executes the program and opens the software, so that the software is switched from the sleep stage to the instruction waiting stage.

In an embodiment, the input device further includes a backlight module, and the backlight module is located under the key module. The backlight module includes a circuit board. At least one first light-emitting element is installed on the circuit board and emits a first light beam toward the luminous display area.

In an embodiment, the at least one first light-emitting element is located under the luminous display area.

In an embodiment, the first light-emitting element is a direct-type light-emitting element.

In an embodiment, the backlight module further includes a light guide layer, and the circuit board is attached on a bottom surface of the light guide layer. The light guide layer further includes at least one first opening. The at least one first light-emitting element is accommodated within the at least one first opening.

In an embodiment, at least one second light-emitting element is installed on the circuit board, and the at least one second light emitting element emits a second light beam toward the light guide layer. The second light beam is transferred within the light guide layer. A direction of the second light beam is perpendicular to a direction of the first light beam.

In an embodiment, the light guide layer further includes at least one second opening, and the at least one second light-emitting element is accommodated within the at least one second opening.

In an embodiment, the light guide layer further includes a light isolation structure, and the light isolation structure is arranged between the at least one first light-emitting element and the at least one second light-emitting element.

In an embodiment, the second light-emitting element is a side-view light-emitting element.

In an embodiment, In an embodiment, the luminous display area is in a basic luminous mode when the software is in the sleep stage, the luminous display area is in a first luminous mode when the software is in the instruction waiting stage, the luminous display area is in a second luminous mode when the software is in the instruction receiving stage, the luminous display area is in a third luminous mode when the software is in the instruction computing stage, and the luminous display area is in a fourth luminous mode when the software is in the result generating stage. The basic luminous mode, the first luminous mode, the second luminous mode, the third luminous mode and the fourth luminous mode are different luminous modes.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
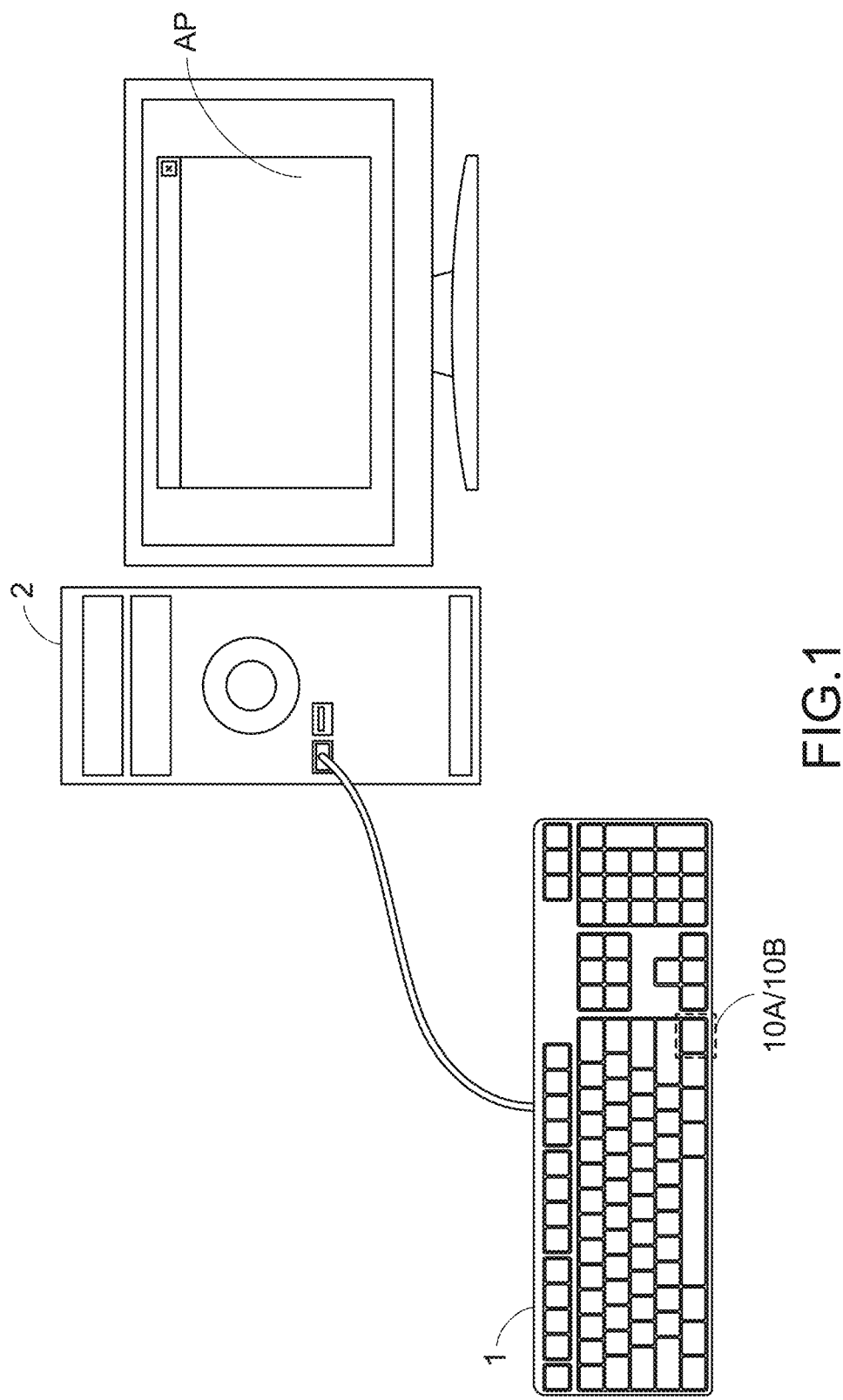
FIG. 1 is a schematic diagram illustrating the architecture of a software running status indication system according to an embodiment of the present invention.
Figure 2A:
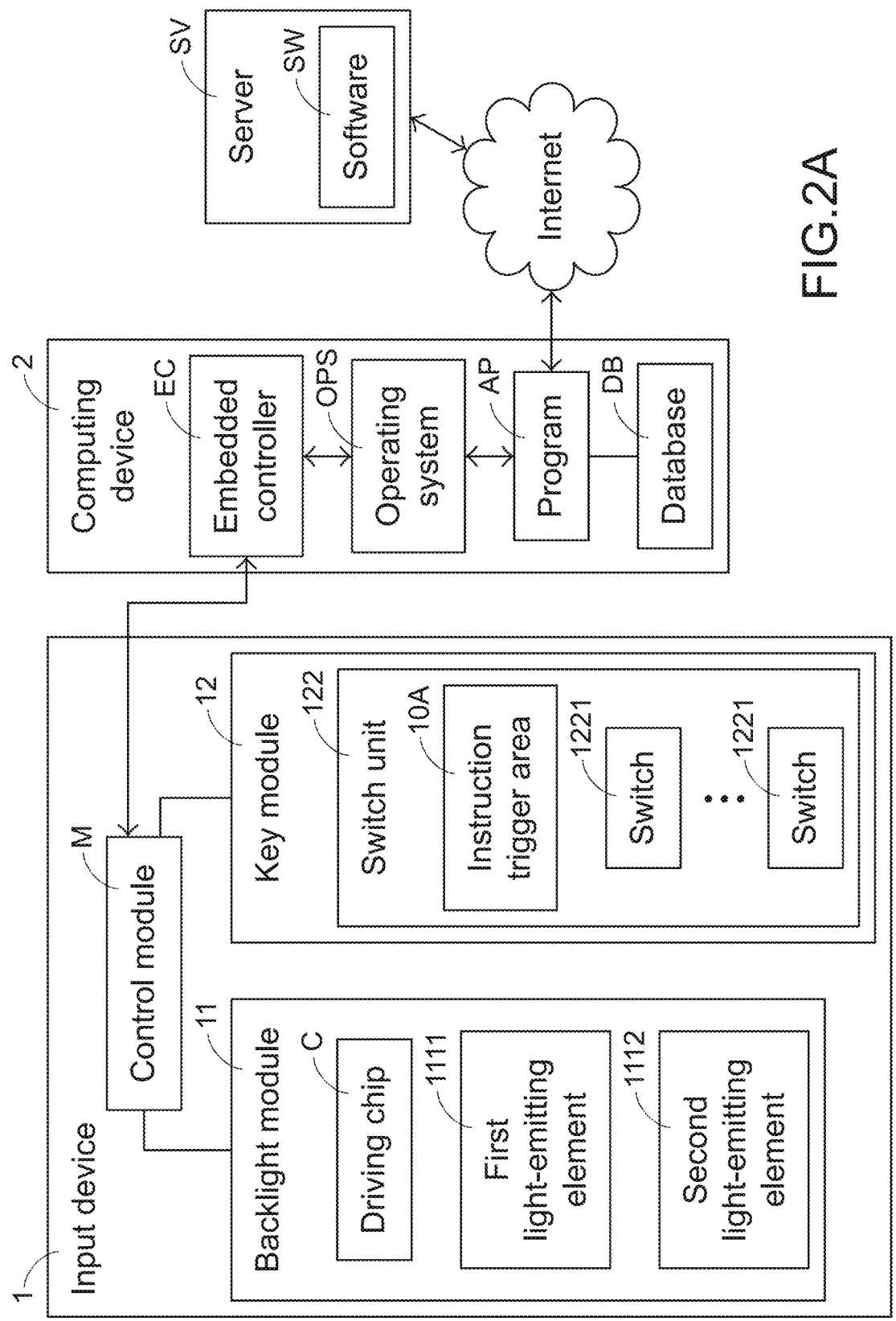
FIG. 2A is a schematic functional block diagram illustrating an implementation example of the software running status indication system of the present invention.
Figure 2B:
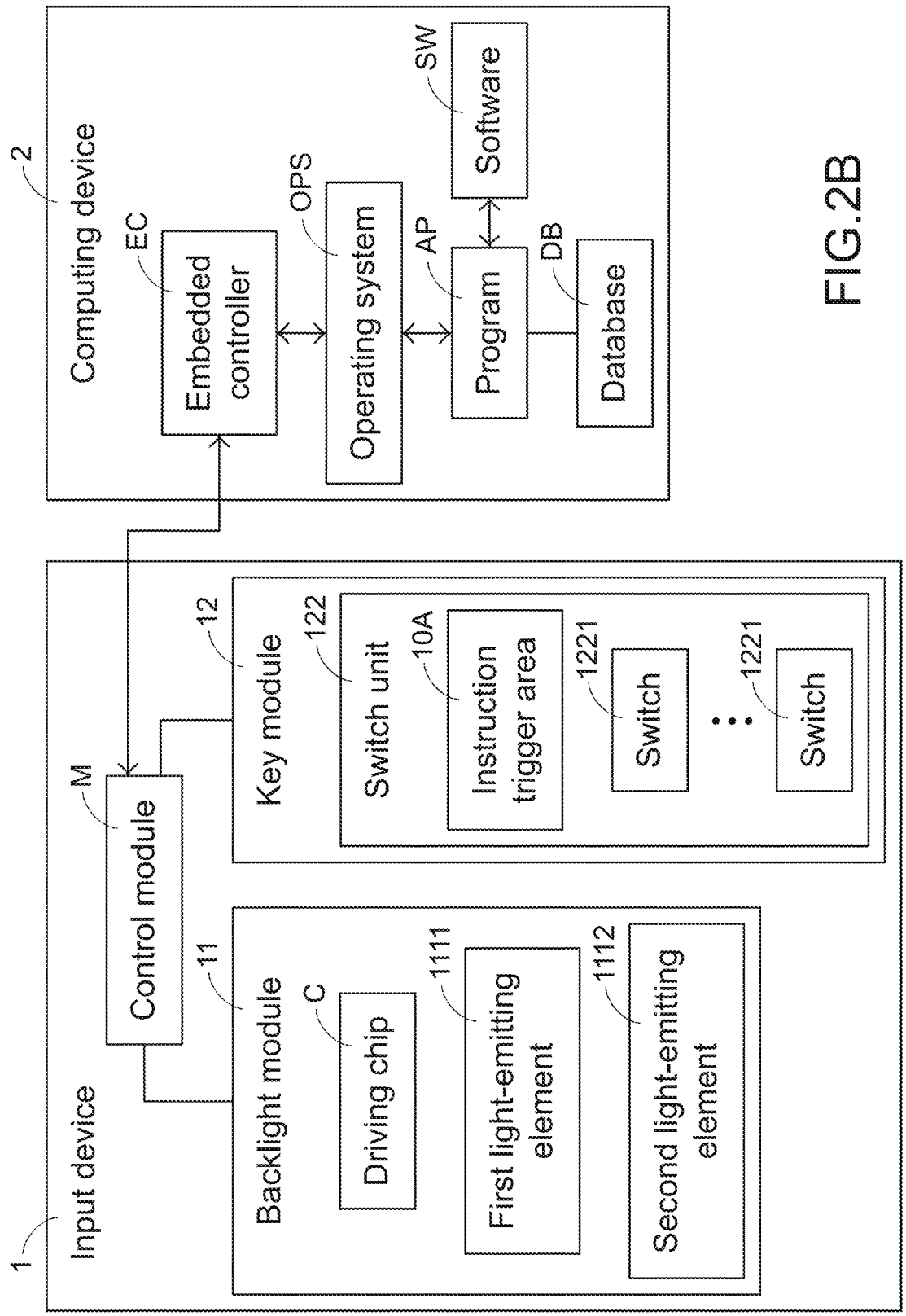
FIG. 2B is a schematic functional block diagram illustrating another implementation example of the software running status indication system of the present invention.
Figure 3:
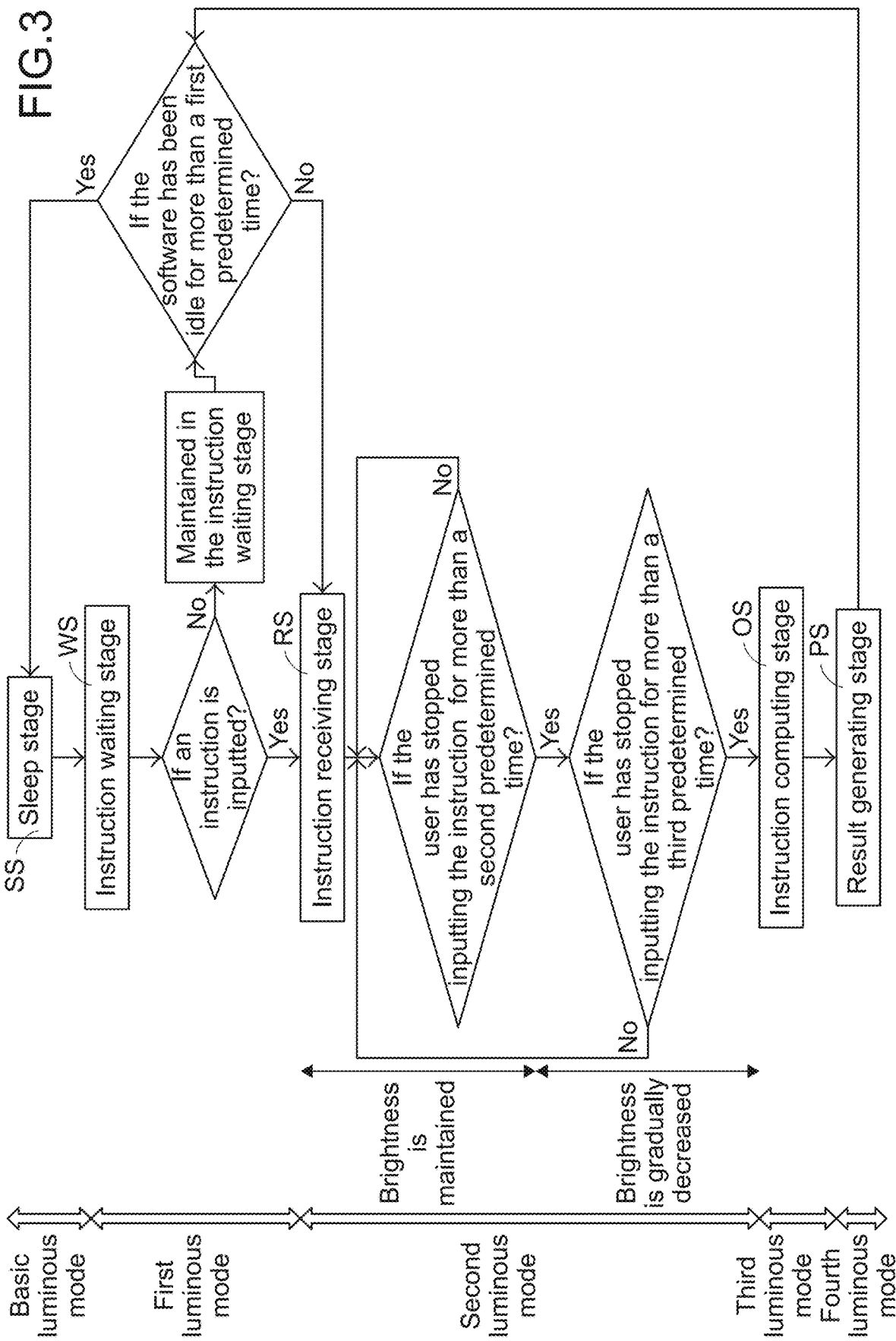
FIG. 3 is a schematic diagram illustrating the luminous modes of the luminous display area corresponding to various stages of the running status of the software.
Figure 4:
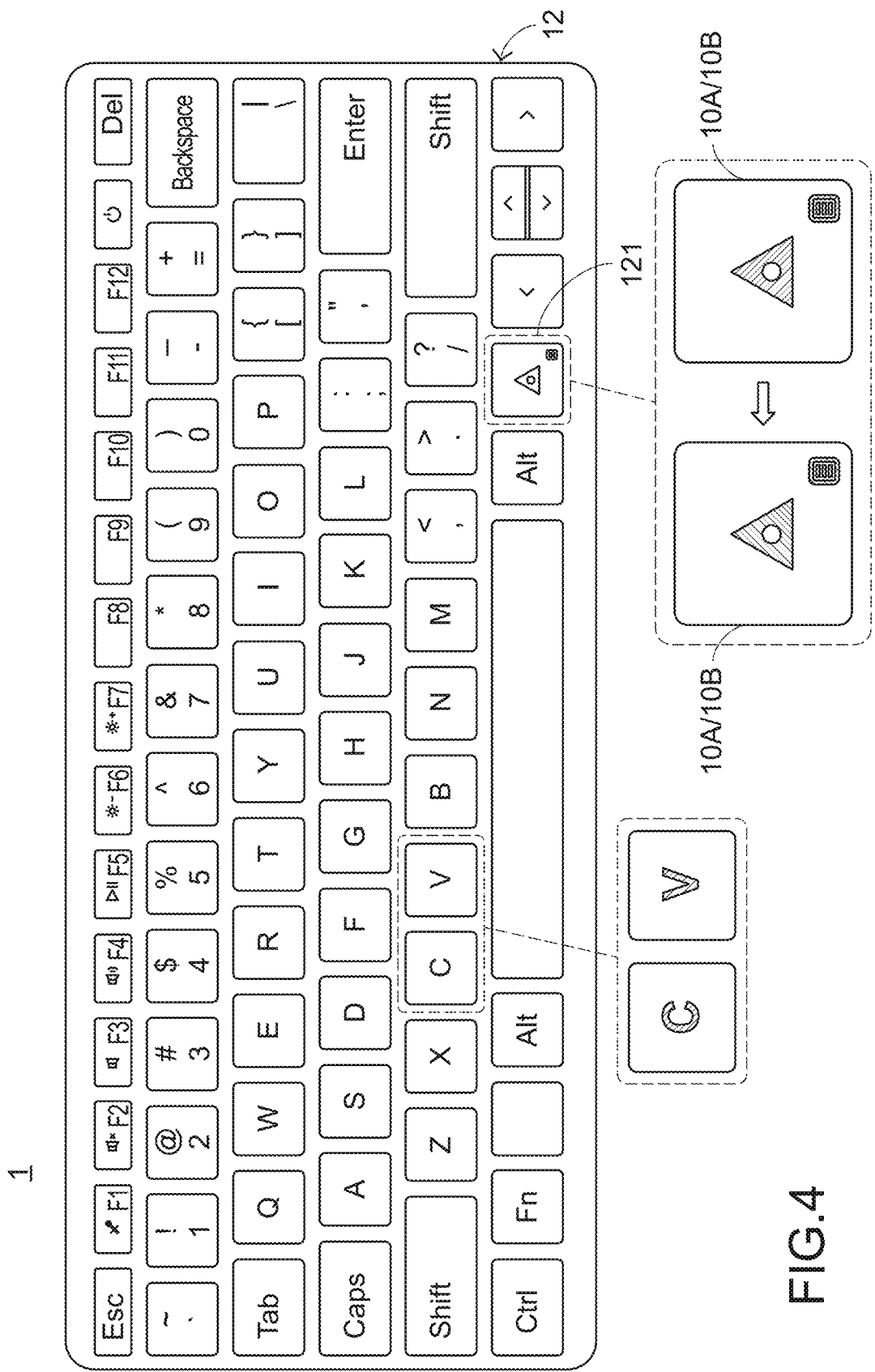
FIG. 4 is a schematic diagram illustrating the condition when the luminous mode of the input device is switched.
Figure 5:
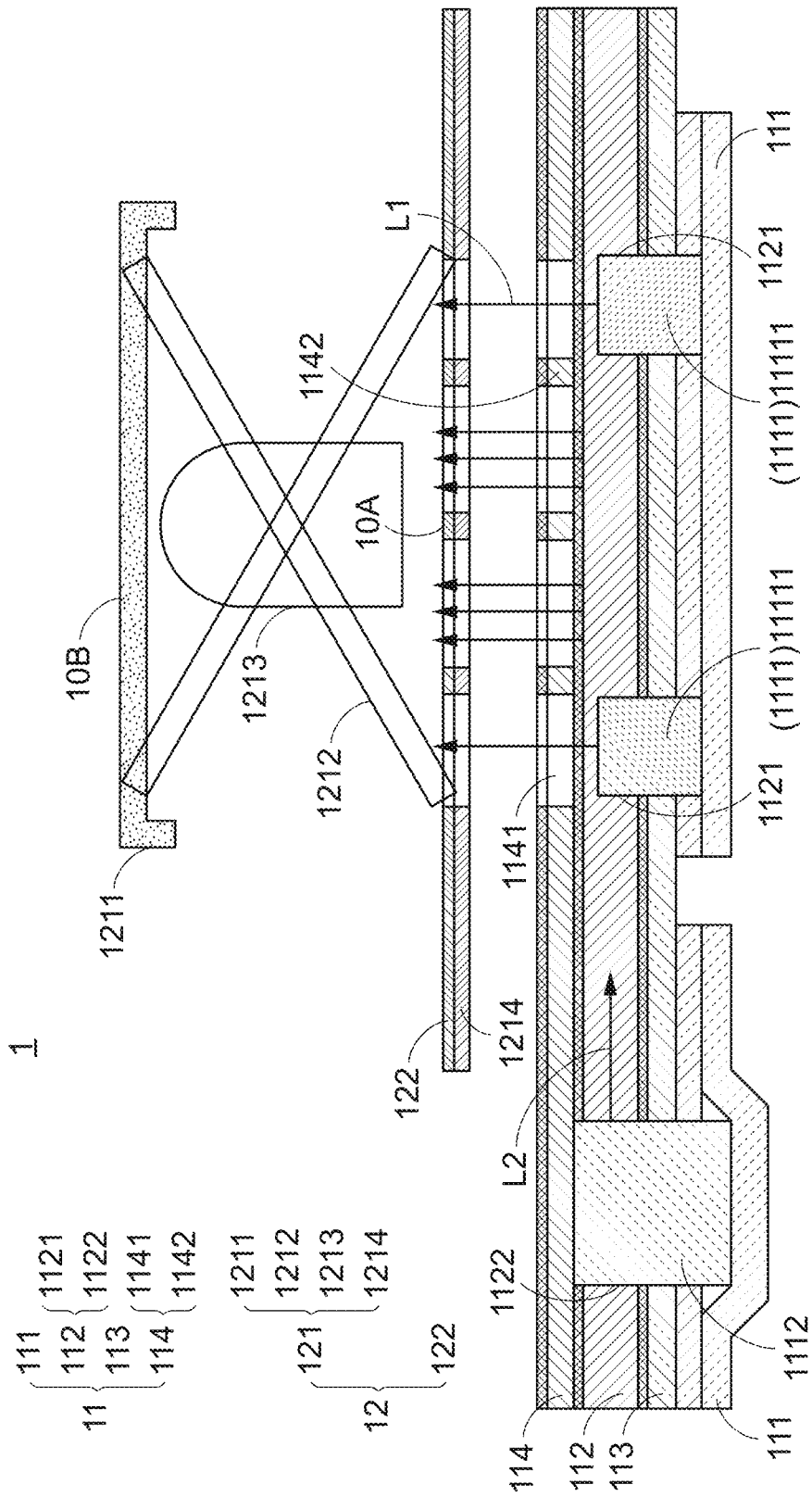
FIG. 5 is a schematic cross-sectional view illustrating an exemplary structure of the input device in the software running status indication system of the present invention.
Figure 6:
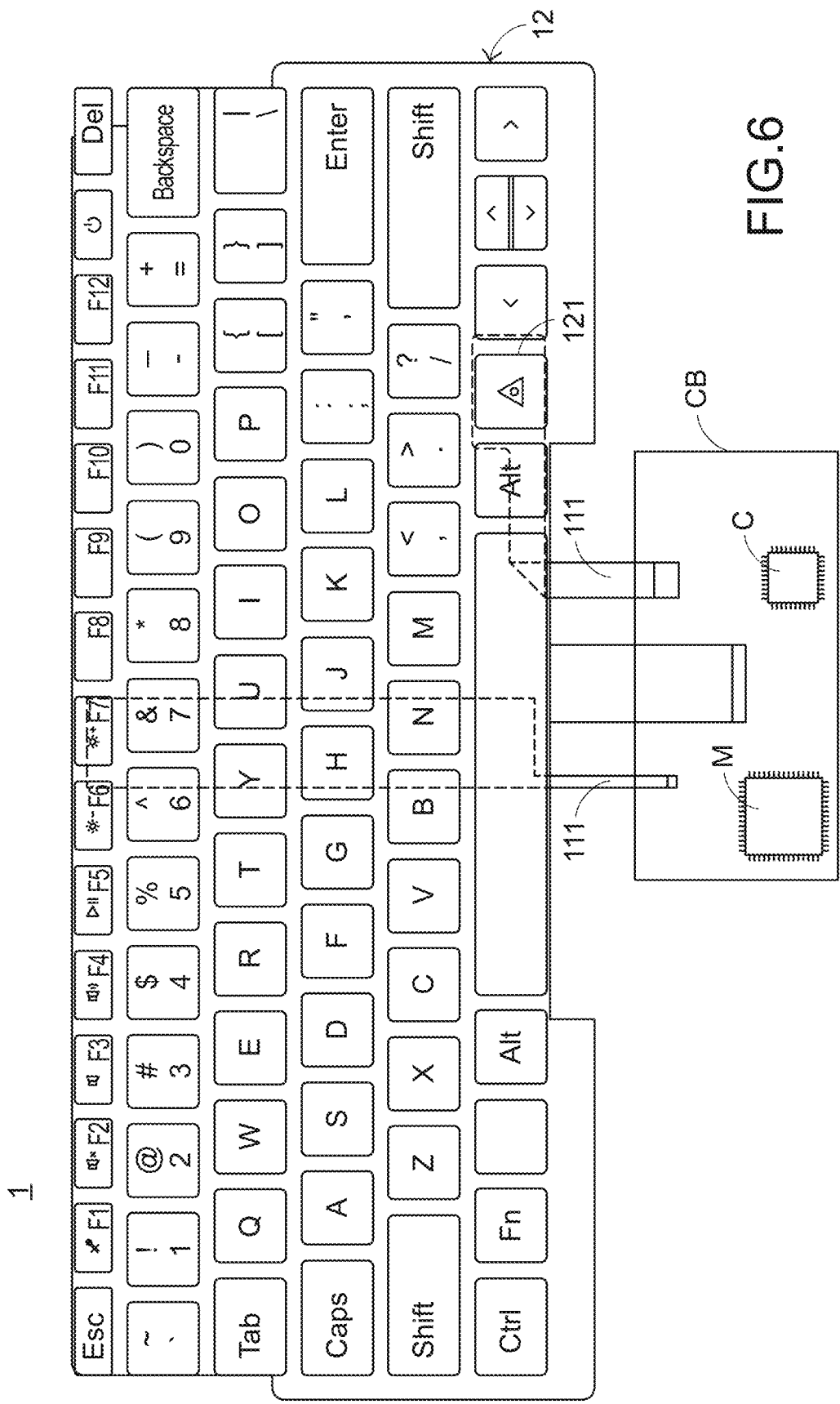
FIG. 6 is a schematic diagram illustrating a drive chip and a control module for the input device of the present invention.
Figure 7:
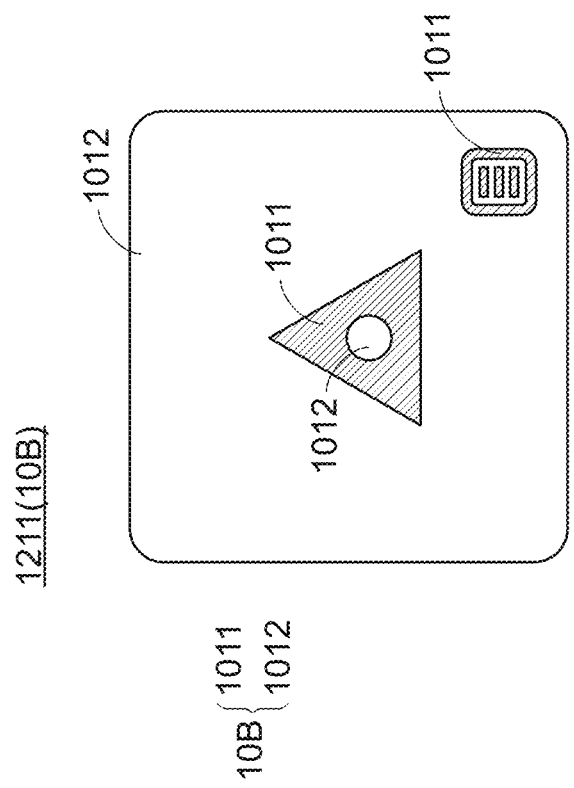
FIG. 7 is a schematic top view illustrating a keycap of a key structure in a key module of the input device of the present invention.
Figure 8:
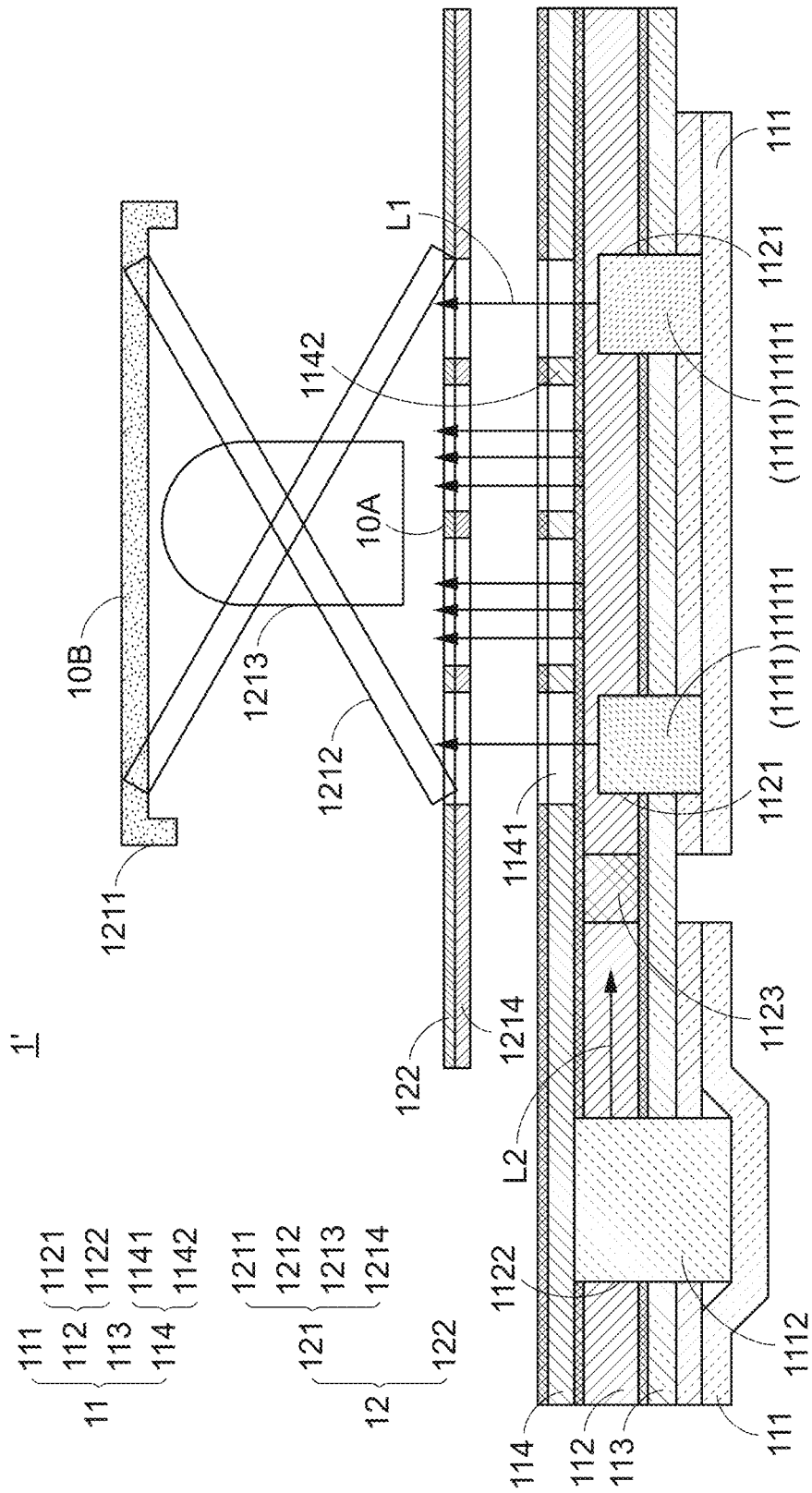
FIG. 8 is a schematic cross-sectional view illustrating another exemplary structure of the input device in the software running status indication system of the present invention.

FIG. 1 is a schematic diagram illustrating the architecture of a software running status indication system according to an embodiment of the present invention. FIG. 2A is a schematic functional block diagram illustrating an implementation example of the software running status indication system of the present invention. FIG. 2B is a schematic functional block diagram illustrating another implementation example of the software running status indication system of the present invention. FIG. 3 is a schematic diagram illustrating the luminous modes of the luminous display area 10B corresponding to various stages of the running status of the software SW. FIG. 4 is a schematic diagram illustrating the condition when the input device 1 is switched from one luminous mode to another luminous mode. FIG. 5 is a schematic cross-sectional view illustrating an exemplary structure of the input device 1 in the software running status indication system of the present invention. FIG. 6 is a schematic diagram illustrating a drive chip C and a control module M for the input device 1 of the present invention. FIG. 7 is a schematic top view illustrating a keycap 1211 of a key structure 121 in a key module 12 of the input device 1 of the present invention. FIG. 8 is a schematic cross-sectional view illustrating another exemplary structure of the input device 1' in the software running status indication system of the present invention.

As shown in FIG. 1, the software running status indication system includes an input device 1 and a computing device 2.

The input device 1 is connected with the computing device 2 in a wired transmission manner or a wireless transmission manner. Consequently, the computing device 2 can receive signals from the input device or send signals back to the input device 1. The computing device 2 has a program AP. The program AP can be executed in the computing device 2. When the program AP is executed, a software SW can be opened or closed, and the running status of the software SW can be obtained and sent back to the input device 1. Preferably but not exclusively, the input device 1 is a keyboard, the computing device 2 is a notebook computer or a desktop computer, the program AP is an application program, and the software SW is a generative artificial intelligence software (e.g. Microsoft® Co-pilot® or Open AI® Chatgpt®).

Please refer to FIG. 2A. FIG. 2A is a schematic functional block diagram illustrating an implementation example of the software running status indication system of the present invention. The input device 1 includes a control module M. The control module M is coupled to at least one first light-emitting element 1111 and at least one second light-emitting element 1112 of a backlight module 11 and a switch unit 122 of a key module 12. The switch unit 122 includes an instruction trigger area 10A and plural switches 1221. In this embodiment, the control module M is further coupled to the at least one first light-emitting element 1111 and the at least one second light-emitting element 1112 through a driving chip C. For example, the control module M is a microcontroller unit (MCU).

The computing device 2 includes an embedded controller EC, an operating system OPS and the program AP. Of course, the computing device 2 also includes hardware components such as a central processing unit, a memory and a display device. These hardware components can be used to store and execute the operating system OPS, application software and hardware drivers. In addition, these hardware components can display associated information according to the execution of the operating system OPS, the application software and the hardware driver.

When the instruction trigger area 10A in the input device 1 is activated or triggered, the operating system OPS in the computing device 2 is controlled to execute the program AP. An implementation example of controlling the operating system OPS to execute the program AP through the instruction trigger area 10A will be described as follows.

The input device 1 is coupled to the embedded controller EC. In addition, the embedded controller EC is coupled to the operating system OPS. The control module M controls the input device 1 through the pre-stored firmware in the control module M. On the other hand, pre-stored firmware in the embedded controller EC also has the function of controlling the input device 1. The driver of the input device 1 is previously installed in the operating system OPS. Consequently, the driver can be executed by the operating system OPS to support the operation of the input device 1.

Under the control of the firmware, the control module M scans the switch unit 122 in the input device 1. If any switch 1221 is triggered or activated (e.g., pressed and released), the control module M generates a corresponding make code (or referred as a pass code) and a break code. In addition, the make code and the break code are transmitted from the control module M to the embedded controller EC. The embedded controller EC receives the make code and the break code. In response to the make code, the embedded controller EC generates an internal code to the operating system OPS. According to the received internal code, the operating system OPS parses the operating status of the input device 1 and performs the subsequent actions.

The control module M and the embedded controller EC store the pre-planned firmware according to the type and the function of the input device 1. When the instruction trigger area 10A of the input device 1 is activated or triggered, the control module M responds to the activation of the instruction trigger area 10A and generates a corresponding make code. After the embedded controller EC receives the make code, the embedded controller EC generates a usage code in response to the make code. In addition, the embedded controller EC sends the usage code to the operating system OPS to inform that instruction trigger area 10A is activated. After the operating system OPS receives the usage code, the program AP is further executed. In an embodiment, the program AP further provides a request to a server SV through the Internet. In response to the request, the server SV opens a software SW on the server SV. After the software SW is opened, the program AP further compares the running information of the software SW with a previously built database DB to obtain the running status of the software SW. In addition, the running status of the software SW is sent back to the control module M through the embedded controller EC.

According to the stage of the running status of the software SW, the current flowing through at least one first light-emitting element 1111 and the PWM signal provided to the at least one first light-emitting element 1111 are also controlled by the control module M. Consequently, the at least one first light-emitting element 1111 presents different luminous modes according to each stage of the running status of the software SW. When the instruction trigger area 10A is activated or triggered again, the program AP provides a request to the server SV through the Internet again, and the server SV closes the software SW in response to the request.

FIG. 2B is a schematic functional block diagram illustrating another implementation example of the software running status indication system of the present invention. The concepts of this embodiment are substantially identical to those of the previous embodiment, and thus the similarities will not be redundantly described herein. In comparison with the above embodiment, the software SW is not installed in the server SV in accordance with this embodiment. In contrast, the software SW is installed in the client side (i.e., the computing device 2) in accordance with this embodiment. In this embodiment, the program AP does not need to provide a request to the server SV through the Internet, and all operations are executed on the client side.

In addition to the instruction trigger area 10A, the input device 1 has a luminous display area 10B (See FIG. 4). The luminous mode of the at least one light-emitting element 1111 will inform the user of the running stage of the software SW through the luminous display area 10B.

FIG. 3 is a schematic diagram illustrating the luminous modes of the luminous display area 10B corresponding to various stages of the running status of the software SW. The running status of the software SW mainly include at least one stage of a sleep stage SS, an instruction waiting stage WS, an instruction receiving stage RS, an instruction computing stage OS and a result generating stage PS. Hereinafter, each stage will be described in more details.

In the sleep stage SS, the computing device 2 has not executed the program AP, and thus the software SW has not been opened. Meanwhile, the luminous display area 10B is in a basic luminous mode.

After the computing device 2 executes the program AP and opens the software SW, the program AP detects that the software SW enters the instruction waiting stage WS. That is, the software SW waits for the user to input instructions. Meanwhile, the luminous display area 10B is in a first luminous mode.

When the program AP detects that the user starts to input an instruction to the software SW (e.g., the voice input through a microphone or the text input through a keyboard), the software SW enters the instruction receiving stage RS. Meanwhile, the luminous display area 10B is in a second luminous mode.

When the user stops inputting the instruction to the software SW and the software SW generates results, the program AP detects that the software SW enters the instruction computing stage OS, and the luminous display area 10B is in a third luminous mode.

After the software SW starts to generate the result, the program AP detects that the software SW enters the result generating stage PS, and the luminous display area 10B is in a fourth luminous mode.

In an embodiment, the basic luminous mode, the first luminous mode, the second luminous mode, the third luminous mode and the fourth luminous mode are different luminous modes. Preferably but not exclusively, in the basic luminous mode, the luminous display area 10B displays the white light effect. Preferably but not exclusively, in the first luminous mode, the luminous display area 10B displays the color light effect. Preferably but not exclusively, in the second luminous mode, the luminous display area 10B displays a light effect of color flow. Preferably but not exclusively, in the third luminous mode, the luminous display area 10B displays a light effect of color breathing. Preferably but not exclusively, in the fourth luminous mode, the luminous display area 10B displays a light effect of color rotation.

In an embodiment, when the program AP detects that the software SW has been idle for more than a first predetermined time (e.g., 3 seconds), the program AP directly closes the software SW, and the luminous display area 10B is restored to the basic luminous mode. For example, when the program AP detects that the software SW is in the instruction waiting stage WS, the program AP will judge whether an instruction has been inputted into the software SW. If no instruction has been inputted into the software SW, the software SW is maintained in the instruction waiting stage. If the program AP further detects that the software SW has been idle for more than a first predetermined time (e.g., 3 seconds), the program AP directly closes the software SW, and the luminous display area 10B is restored to the basic luminous mode. Similarly, after the program AP detects that the software SW is in the result generating stage PS (i.e., the result is generated), if the program AP further detects that the software SW has been idle for more than the first predetermined time (e.g., 3 seconds), the program AP directly closes the software SW, and the luminous display area 10B is restored to the basic luminous mode.

In an embodiment, when the software SW is in the instruction receiving stage RS, the program AP detects the condition of inputting instructions by the user. If the user has stopped inputting the instruction for more than a second predetermined time (e.g., 0.2 second), the program AP further controls the first light-emitting element 1111 through the embedded controller EC and the control module M. Consequently, the input device 1 reminds the user through the luminous display area 10B. For example, the brightness of the luminous display area 10B is gradually changed (e.g., the brightness is gradually decreased by 25%). Furthermore, if the program AP detects that the user has stopped inputting instructions for more than a third predetermined time (e.g., 2 seconds), the program AP further enables the software SW to directly enter the instruction computing stage OS, and the luminous display area 10B is in the third luminous mode.

FIG. 4 is a schematic diagram illustrating the condition when the luminous mode of the input device 1 is switched. In an embodiment, the instruction trigger area 10A and the luminous display area 10B of the input device 1 are integrated into a key structure 121 of the key module 12 of the input device 1. That is, when this key structure 121 is pressed by the user, the computing device 2 executes the program AP to open or close the software SW, and the key structure 121 also allows the user to know the stage of the running status of the software SW according to different luminous modes.

Please refer to FIG. 4 again. When the software SW is not opened, the key structure 121 will display the corresponding basic luminous mode, which is like the luminous mode of any other ordinary key or functional key in the input device 1 (e.g., C key and V key). For example, in the basic luminous mode, a white light effect is generated. When the user opens the software SW through the key structure 121, the key structure 121 is in the corresponding first luminous mode. For example, in the first luminous mode, a light effect of multiple colors will be generated.

The structure of the input device 1 of the present invention will be described in more details as follows. Please refer to FIG. 5. FIG. 5 is a schematic cross-sectional view illustrating an exemplary structure of the input device 1 in the software running status indication system of the present invention. In an embodiment, the input device 1 includes the backlight module 11 and the key module 12. The backlight module 11 is located under the key module 12.

The input device 1 can provide the illuminating function through the backlight module 11. In an embodiment, the backlight module 11 includes the at least one circuit board 111 and a light guide layer 112. The at least one circuit board 111 is attached on the bottom surface of the light guide layer 112.

Please refer to FIG. 5 and FIG. 6. The at least one circuit board 111 includes the at least one first light-emitting element 1111, the at least one second light-emitting element 1112 and the driving chip C (i.e., an integrated circuit IC). There are electrical traces (not shown) electrically connected between the at least one first light-emitting element 1111 and the driving chip C and electrically connected between the at least one second light-emitting element 1112 and the driving chip C. Consequently, the driving chip C can independently control the currents flowing through the at least one first light-emitting element 1111 and the at least one second light-emitting element 1112 and the pulse-width modulation (PWM) signals provided to the at least one first light-emitting element 1111 and the at least one second light-emitting element 1112. The driving chip C can be connected to the control module M through a signal connection terminal or other electrical traces (not shown). Preferably but not exclusively, the control module M and the driving chip C are integrated into the same control board CB.

The at least one first light-emitting element 1111 is located directly under the at least one key structure 121. The at least one first light-emitting element 1111 emits a first light beam L1 in the direction toward at least one key structure 121. Preferably but not exclusively, the first light-emitting element 1111 is a direct-type light-emitting element. In an embodiment, the first light-emitting element 1111 includes plural light-emitting units 11111. The plural light-emitting units 11111 can produce a first light beam L1 with a specific hue by mixing light beams at a specified brightness ratio. Preferably but not exclusively, the first light-emitting element 1111 is a polychromatic LED (e.g., a RGB LED).

The at least one second light emitting element 1112 emits a second light beam L2 in the direction toward the light guide layer 112. The direction of the second light beam L2 is perpendicular to the direction of the first light beam L1. The second light beam L2 is transferred within the input device 1 through the light guide layer 112. The at least one second light-emitting element 1112 is located at a position far away from the at least one key structure 121. That is, the at least one second light-emitting element 1112 is not located under the at least one key structure 121. Preferably but not exclusively, the second light-emitting element 1112 is a side-view light-emitting element. Preferably but not exclusively, the second light-emitting element 1112 is a monochromatic LED (e.g., a white light LED).

The driving chip C is used to control the current flowing through at least one first light emitting element 1111 and the PWM signal provided to the at least one first light emitting element 1111. Consequently, the first light-emitting element 1111 can be switched between various luminous modes. Preferably but not exclusively, in various luminous modes, the light effect of a static color light, the light effect of a dynamic flow, the light effect of color rotation, the light effect of color breathing, the flashing light effect and any other appropriate light effect.

The light guiding layer 112 is used to transfer the light beam within the input device 1. Preferably but not exclusively, the light guide layer 112 is made of polymethyl methacrylate. The light guiding layer 112 includes at least one first opening 1121 and at least one second opening 1122. The at least one first opening 1121 is used to accommodate the at least one first light-emitting element 1111. Consequently, the first opening 1121 is also located directly under the at least one key structure 121. In addition, the number of the at least one first openings 1121 is determined according to the number of the at least one first light-emitting elements 1111. The at least one second opening 1122 is used to accommodate the at least one second light-emitting element 1112. The second opening 1122 is located at the position farther from the key module 121 than the first opening 1121. That is, the at least one second opening 1122 is not located under the at least one key structure 121.

In an embodiment, the backlight module 11 further includes a reflective layer 113 and a shielding layer 114. The light beam transferred within the light guide layer 112 can be reflected by the reflective layer 113. The reflective layer 113 is arranged between the circuit board 111 and the light guide layer 112. Preferably but not exclusively, the reflective layer 113 is attached on a bottom surface of the light guide layer 112 through an adhesive, or the reflective layer 113 is formed on the bottom surface of the light guide layer 112 through a coating process. The shielding layer 114 is disposed on a top surface of the light guide layer 112. The shielding layer 114 includes light-transmissible portions 1141 and light-shielding portions 1142. The light-transmissible portions 1141 are arranged between the light-shielding portions 1142. In other words, the light-transmissible portions 1141 and the light-shielding portions 1142 are alternately arranged and formed in the shielding layer 114. The light-transmitting portion 1141 is located over the first light-emitting element 1111. The first light beam L1 is allowed to pass through the light-transmissible portions 1141 of the shielding layer 114. The light beam transferred within the light guide layer 112 is sheltered by the light-shielding portions 1142. Consequently, the light beam will not leak out during the transfer process.

The key module 12 is located over the backlight module 11. The key module 12 includes at least one key structure 121 and a switch unit 122. The at least one key structure 121 is located over the switch unit 122. Each key structure 121 includes a keycap 1211, a connecting member 1212, an elastic restoring member 1213 and a supporting layer 1214. The keycap 1211 can be pressed by the user. The connecting member 1212 is movably connected with the keycap 1211 and the supporting layer 1214. Preferably but not exclusively, the connecting member 1212 is a scissor-type linkage. An end of the elastic restoring member 1213 is connected to or contacted with the bottom surface of the keycap 1211. The elastic restoring member 1213 is used to provide a restoring force for the keycap 1211. In response to the restoring force, the keycap 1211 can be returned to its original height after being pressed. Preferably but not exclusively, the elastic restoring member 1213 is a rubber dome or a metal dome. The supporting layer 1214 is used for supporting the key structure 121. Consequently, it is preferred that the supporting layer 1214 is made of a hard material. Preferably but not exclusively, the supporting layer 1214 is made of a metallic material or a plastic material. The supporting layer 1214 is pivotally coupled to the connecting member 1212 through a hook structure (not shown) on the top surface.

Please refer to FIG. 7. FIG. 7 is a schematic top view illustrating a keycap 1211 of a key structure 121 in a key module 12 of the input device 1 of the present invention. The luminous display area 10B is disposed on the top surface of the keycap 1211. The luminous display area 10B includes at least one light-transmissible region 1011 and at least one opaque region 1012. Each light-transmissible region 1011 is arranged between two adjacent opaque regions 1012. That is, the at least one light-transmissible region 1011 and at least one opaque region 1012 are alternately arranged in the luminous display area 10B. In an embodiment, the main body of the keycap 1211 is made of a transparent material or a translucent material. That is, the keycap 1211 has the light-transmissible property under the irradiation of visible light. A process of forming the light-transmissible region 1011 and the opaque region 1012 will be described as follows. Firstly, a light-shielding material is coated or sprayed on the surface of the transparent main body of the keycap 1211. Then, a portion of the light-shielding material is removed by a laser engraving process or an etching process. The removed portion is formed as a pattern, a text, a symbol, a number or a combination thereof. Furthermore, the removed portion of the light-shielding material is defined as the light-transmissible region 1011, and the unremoved portion of the light-shielding material is defined as the opaque region 1012. The light beam (e.g., the first light beam L1 or the second light beam L2) can be outputted from the light-transmissible region 1011. The light beam is blocked from passing through the opaque region 1012.

The switch unit 122 is arranged between the key structure 121 and the backlight module 11. The switch unit 122 is disposed on the top surface of the supporting layer 1214. Preferably but not exclusively, the switch unit 122 is a multilayered membrane circuit. The instruction trigger area 10A is disposed on the switch unit 122. When the instruction trigger area 10A is triggered, the computing device 2 opens or closes the software SW. In an embodiment, the instruction trigger area 10A is located directly under at least one key structure 121. When the user presses the keycap 1211 of at least one key structure 121, the elastic restoring member 1213 further triggers the instruction trigger area 10A. Consequently, the computing device 2 executes the program AP and opens or closes the software SW.

FIG. 8 is a schematic cross-sectional view illustrating another exemplary structure of the input device 1' in the software running status indication system of the present invention. The structure of the input device of this embodiment is substantially identical to that of the previous embodiment, and thus the similarities will not be redundantly described herein. In comparison with the above embodiment, the light guide layer 112' in the input device 1 of this embodiment is additionally equipped with a light isolation structure 1123. The light isolation structure 1123 is arranged between the first light-emitting element 1111 and the second light-emitting element 1112. The second light beam L2 generated by the second light-emitting element 1112 will be blocked by the light isolation structure 1123. In this embodiment, the luminous display area 10B is illuminated by the first light beam L1 from the first light-emitting element 1111, and the second light L2 emitted by the second light-emitting element 1112 is used to illuminate other character keys or functional keys of the input device 1'. Preferably but not exclusively, the light isolation structure 1123 is a slotted structure.

From the above descriptions, the present invention provides the input device. As the luminous mode is switched, the user can clearly realize the stage of the running status of the software SW.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A software running status indication system, comprising:
   a computing device, wherein when a program is executed in the computing device, the program acquires a running status of a software, wherein the running status of the software includes at least one of a sleep stage, an instruction waiting stage, an instruction receiving stage, an instruction computing stage and a result generating stage, wherein when the software is in the instruction receiving stage, the program further judges whether the instruction receiving stage has been idle for more than a first predetermined time; and
   an input device connected with the computing device, and comprising a luminous display area, wherein the running status of the software is displayed through the luminous display area, wherein if the instruction receiving stage has been idle for more than the first predetermined time, a brightness of the luminous display area is gradually decreased.

2. The software running status indication system according to claim 1, wherein when the software is in the sleep stage, the luminous display area is in a basic luminous mode, wherein when the software is in the instruction waiting stage, the luminous display area is in a first luminous mode, wherein when the software is in the instruction receiving stage, the luminous display area is in a second luminous mode, wherein when the software is in the instruction computing stage, the luminous display area is in a third luminous mode, wherein when the software is in the result generating stage, the luminous display area is in a fourth luminous mode, wherein the basic luminous mode, the first luminous mode, the second luminous mode, the third luminous mode and the fourth luminous mode are different luminous modes.

3. The software running status indication system according to claim 1, wherein when the software is in the instruction waiting stage, the program judges whether an instruction has been inputted, wherein if the program judges that any instruction has been inputted, the software enters the instruction receiving stage.

4. The software running status indication system according to claim 3, wherein if the program judges that no instruction has been inputted, the software is maintained in the instruction waiting stage, and then the program judges whether the software has been idle for more than a second predetermined time, wherein if the software has been idle for more than the second predetermined time, the program allows the software to be restored to the sleep stage.

5. The software running status indication system according to claim 4, wherein the second predetermined time is 3 seconds.

6. The software running status indication system according to claim 1, wherein if the program judges that the instruction receiving stage has been idle for more than a third predetermined time, the program allows the software to enter the instruction computing stage.

7. The software running status indication system according to claim 6, wherein the second predetermined time is 0.2 second, and the third predetermined time is 2 seconds.

8. The software running status indication system according to claim 1, wherein the input device further comprises a control module and an instruction trigger area, and the computing device further comprises an embedded controller.

9. The software running status indication system according to claim 8, wherein when the control module detects that the instruction trigger area is activated or triggered, the control module controls the computing device to execute the program through the embedded controller, and the program further opens the software.

10. The software running status indication system according to claim 9, wherein when the control module detects that the instruction trigger area is activated or triggered again, the control module controls the computing device through the embedded controller, so that the program closes the software.

11. An input device connected with a computing device, wherein when a program is executed in the computing device, the program acquires a running status of a software, wherein the running status of the software includes at least one of a sleep stage, an instruction waiting stage, an instruction receiving stage, an instruction computing stage and a result generating stage, wherein when the software is in the instruction receiving stage, the program further judges whether the instruction receiving stage has been idle for more than a first predetermined time, wherein the input device includes a luminous display area, and the running status of the software is displayed through the luminous display area, wherein if the instruction receiving stage has been idle for more than the first predetermined time, a brightness of the luminous display area is gradually decreased.

12. The input device according to claim 11, wherein the running status of the software includes at least one of a sleep stage, an instruction waiting stage, an instruction receiving stage, an instruction computing stage and a result generating stage.

13. The input device according to claim 12, wherein the input device further comprises a key module, and the key module comprise at least one key structure, wherein one of the at least one key structure comprises a keycap, and the luminous display area is formed on the keycap.

14. The input device according to claim 13, wherein the key module comprises a switch unit, the switch unit comprises an instruction trigger area, and the instruction trigger area is located under the at least one key structure, wherein when the instruction trigger area is activated or triggered, the computing device executes the program and opens the software, so that the software is switched from the sleep stage to the instruction waiting stage.

15. The input device according to claim 13, wherein the input device further comprises a backlight module, and the backlight module is located under the key module, wherein the backlight module comprises a circuit board, and at least one first light-emitting element is installed on the circuit board and emits a first light beam toward the luminous display area.

16. The input device according to claim 15, wherein the at least one first light-emitting element is located under the luminous display area.

17. The input device according to claim 16, wherein the first light-emitting element is a direct-type light-emitting element.

18. The input device according to claim 15, wherein the backlight module further comprises a light guide layer, and the circuit board is attached on a bottom surface of the light guide layer, wherein the light guide layer further comprises at least one first opening, and the at least one first light-emitting element is accommodated within the at least one first opening.

19. The input device according to claim 18, wherein at least one second light-emitting element is installed on the circuit board, and the at least one second light emitting element emits a second light beam toward the light guide layer, wherein the second light beam is transferred within the light guide layer, and a direction of the second light beam is perpendicular to a direction of the first light beam.

20. The input device according to claim 19, wherein the light guide layer further comprises at least one second opening, and the at least one second light-emitting element is accommodated within the at least one second opening.

21. The input device according to claim 19, wherein the light guide layer further comprises a light isolation structure, and the light isolation structure is arranged between the at least one first light-emitting element and the at least one second light-emitting element.

22. The input device according to claim 19, wherein the second light-emitting element is a side-view light-emitting element.

23. The input device according to claim 12, wherein when the software is in the sleep stage, the luminous display area is in a basic luminous mode, wherein when the software is in the instruction waiting stage, the luminous display area is in a first luminous mode, wherein when the software is in the instruction receiving stage, the luminous display area is in a second luminous mode, wherein when the software is in the instruction computing stage, the luminous display area is in a third luminous mode, wherein when the software is in the result generating stage, the luminous display area is in a fourth luminous mode, wherein the basic luminous mode, the first luminous mode, the second luminous mode, the third luminous mode and the fourth luminous mode are different luminous modes.

* * * * *